United States Patent
Hartmann

[19]

[11] Patent Number: 5,964,558
[45] Date of Patent: Oct. 12, 1999

[54] EXPANSION DOWEL

[75] Inventor: Markus Hartmann, Frastanz, Austria

[73] Assignee: Hilti Aktiengesellschaft, Schaan, Liechtenstein

[21] Appl. No.: 08/906,364

[22] Filed: Aug. 5, 1997

[30] Foreign Application Priority Data

Aug. 16, 1996 [DE] Germany ............................ 196 32 879

[51] Int. Cl.⁶ ................................................ F16B 13/04
[52] U.S. Cl. .................. 411/78; 411/75; 411/80
[58] Field of Search .................. 411/62, 60.1, 55, 411/75, 78, 79, 80, 180, 181

[56] References Cited

U.S. PATENT DOCUMENTS

| | | |
|---|---|---|
| 2,104,496 | 1/1938 | Schaefer ................................ 411/62 |
| 2,648,247 | 8/1953 | Schmuziger . |
| 3,881,393 | 5/1975 | Campbell . |
| 3,951,034 | 4/1976 | Chromy . |
| 4,474,515 | 10/1984 | Pitzer . |
| 4,605,350 | 8/1986 | Charter ................................ 411/75 |

FOREIGN PATENT DOCUMENTS

| | | | |
|---|---|---|---|
| 644328 | 8/1964 | Belgium ................................ 411/80 |
| 956348 | 1/1950 | France ................................ 411/78 |
| 2566853 | 1/1986 | France . |
| 3314109 | 10/1984 | Germany ................................ 411/75 |
| 585324 | 12/1977 | Russian Federation .................. 411/75 |
| 661569 | 7/1987 | Switzerland . |
| 2126681 | 3/1984 | United Kingdom . |

OTHER PUBLICATIONS

European Search Report, Number EP 97 810 298.6 dated Aug. 26, 1997.

*Primary Examiner*—Flemming Saether
*Attorney, Agent, or Firm*—Brown & Wood, LLP

[57] ABSTRACT

An expansion dowel including an expansion sleeve (2, 22) radially expandable upon being compressed and having a slot (5) extending along an entire axial length of the expansion sleeve (2, 22) and inclined toward an axis (A) of the expansion sleeve (2, 22), with a respective edge region (6, 7) of the slots extending beyond a respective end surface (8, 9) of the expansive sleeve (2, 22) in an unexpanded condition of the sleeve, and an arrangement (2, 52, 53; 51; 23, 24, 25, 26) for retaining the expansion sleeve (2, 22) in its axially compressed and radially expanded condition.

10 Claims, 3 Drawing Sheets

EXPANSION DOWEL

BACKGROUND OF THE INVENTION

1. Field of the Invention

The present invention relates to an expansion dowel including an expansion sleeve radially expandable upon application an axial force thereto.

2. Description of the Prior Art

U.S. Pat. No. 3,881,393 discloses an expansion dowel including a threaded bolt and a sleeve formed as a helix-shaped sheet metal band mounted on the bolt stem. At its front, in the setting direction, end, the sleeve has a nut-shaped flange into which the bolt is screwed in. During rotation of the bolt, the nut is axially displaced, compressing with its rear end the sleeve which engages a connection constructional component, and thus radially expanding the sleeve. Functioning of this expansion dowel is rather complicated, and forming a sleeve as a sheet metal band, in particular, the formation of the nut-shaped flange requires the use of a special bending tool. Therefore, the manufacture of this expansion dowel is relatively expensive.

British publication GB-A-2, 126, 681 discloses an expansion dowel including an expansion sleeve having a relatively wide longitudinal slot, which extends along the entire length of the sleeve and is inclined toward the sleeve axis. The sleeve has an excessive radial dimension with regard to the receiving bore. The relatively wide longitudinal slot provides for radial compression of the sleeve when the expansion dowel is set into the receiving bore. The inherent spring force of the sleeve provides for expansion of the sleeve in the receiving bore. This expansion dowel is suitable only for use in manufacturing of wooden furniture. The expansion force of this expansion dowel would not be adequate to withstand large axial tension loads.

Accordingly, an object of the present invention is to provide an expansion dowel simple in its construction and its functioning and having a sufficiently high holding force. The expansion force of the expansion dowel should be able to be distributed along the entire longitudinal extent of the expansion dowel in the ground as uniformly as possible.

SUMMARY OF THE INVENTION

The object of the present invention is achieved by providing an expansion dowel including an expansion sleeve which expands radially upon being axially compressed. The expansion sleeve is provided with a slot extending along an entire axial length of the expansion sleeve and inclined toward an axis of the expansion sleeve. In an unexpanded condition, the expansion sleeve extends in an axial direction so that a respective edge region of the slot extends beyond a respective end surface of the expansion sleeve.

There is further provided means for retaining the expansion sleeve in its axially compressed and radially expanded condition. Axial extension of the expansion sleeve reduces its outer diameter. The extension of the expansion sleeve is assured by a longitudinal slot that extends at an angle toward the sleeve axis. The edges of the longitudinal slot extend beyond respective end surfaces of the expansion sleeve. The axial compression of the axially extended sleeve results in that the end surfaces take a position, in which they extend substantially parallel to each other, and the expansion sleeve expands radially. In this way, the circumference of the expansion sleeve imparts, over the entire length of the expansion sleeve, a uniform expansion pressure to the wall of ground bore. The expansion dowel according to the present invention can be produced in a simple and cost-effective manner. Its use is not complicated and is easily understood. Special means prevents the expansion sleeve located in the receiving bore in its expanded condition from returning to its axially extended form. In order to prevent radial displacement of the edge surfaces of the longitudinal slot of the expansion sleeve relative to each other, there are provided, on the edge surfaces of the longitudinal slot, guide elements which slide axially relative to each other and prevent radial displacement of the edge surfaces relative to each other. Advantageously, the guide elements are formed of a groove, formed in one of the edge surfaces, and a corresponding spring on another of the edge surfaces.

According to one embodiment of the present invention an angle, at which the slot extends toward the sleeve, is smaller than or equal to a critical angle. The critical angle is an angle at which self-locking takes place and no further displacement of the edge surfaces of the slot relative to each other occurs. The critical angle is defined by an expression $\alpha = \arctan(\mu_{SLIDE})$ where $(\mu_{SLIDE})$ is a friction coefficient of sliding friction, and wherein the retaining means are formed by edge surfaces of slot sliding relative each other.

The friction force of sliding relative to each other edge surfaces is large enough to insure that self-locking takes place and to prevent returning of the expansion sleeve in its extended position. Such expansion dowel can be very easily inserted in a receiving bore and be radially expanded, e.g., by impacting axially directed blows on the rear end surface of the expansion sleeve. By providing, on the sliding relative to each other edge surfaces, engaging each other ribs or tootings, the friction force can be further increased, with the returning of the expansion sleeve in its unexpanded, initial position being further prevented by form-locking engagement of the ribs or toothings.

Advantageously, the inventive expansion dowel is provided at the rear, in the setting direction, portion of the expansion sleeve with load application means for connection a constructional component. As load application means, an inner thread, into which a connection screw is screwed in, can be used. Also, there can be provided a flange abutting the outer surface of the connection component, providing for its attachment. It is particularly advantageous when the expansion sleeve surrounds a sleeve with an inner thread. In this case, the expansion sleeve is supported on an annular shoulder provided at the front end of the sleeve. In this way, it is insured that the inner thread, which serves as the load application means, remains unobstructed.

In an alternative embodiment of an expansion dowel according to the present invention, the angle at which the slot extends toward the sleeve axis is greater than a critical angle at which self-locking takes place with the critical angle being defined by an expression $\alpha = \arctan(\mu_{SLIDE})$ where $(\mu_{SLIDE})$ is a friction coefficient of sliding friction. In this embodiment, it is necessary to apply a tension force to the to the sleeve to retain the expansion force. To this end, the expansion sleeve is located between two axially spaced stops which are provided on an anchor rod, which stops are displaceable axially relative to each other. Thereby the expansion sleeve is axially compressed and is radially expanded. The stops also form the means for retaining the expansion sleeve in its axially compressed and radially expanded condition. The stops also maintain the tension force in the expansion sleeve. The advantage of this embodiment of the expansion dowel according to the invention consists in that when the tension force of the expansion sleeve causes its return in its initial position, in which respective edge surfaces of the slot extend beyond the respective end surface of the expansion sleeve, the diameter of the expansion sleeve is reduced. In this way, the expansion sleeve can be completely withdrawn.

Advantageously, the anchor rod is formed as a head bolt, with the head forming a front, in a setting direction, stop, and with the rear stop being formed by a nut screwed on an outer thread provided on a rear end of the head bolt. If necessary, a washer is provided between the nut and the rear end surface of the sleeve.

Simple manufacturing of the expansion dowel according to the present invention is achieved by forming the expansion sleeve as a sheet metal bent stamping. A tight holding force can be achieved when the outer surface of the expansion sleeve is provided with friction-increasing means such as projections, ribs or the like. The projections, ribs and so forth engage the wall of the receiving bore during the expansion of the expansion sleeve and form a more or less strong form-locking connection which increases the holding action of the expansion sleeve.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
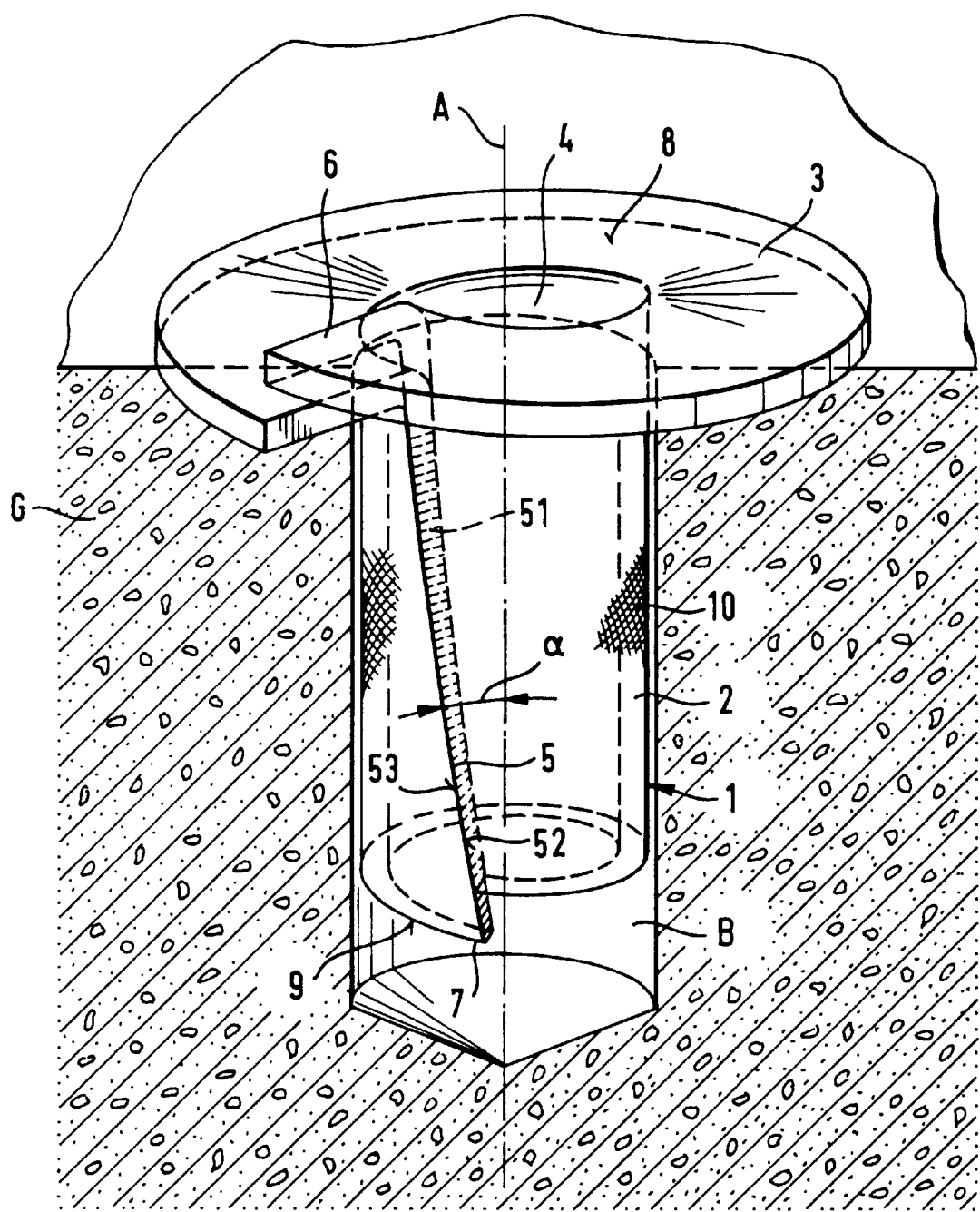
FIG. 1 shows a perspective view of a first embodiment of an expansion dowel according to the present invention.
Figure 2:
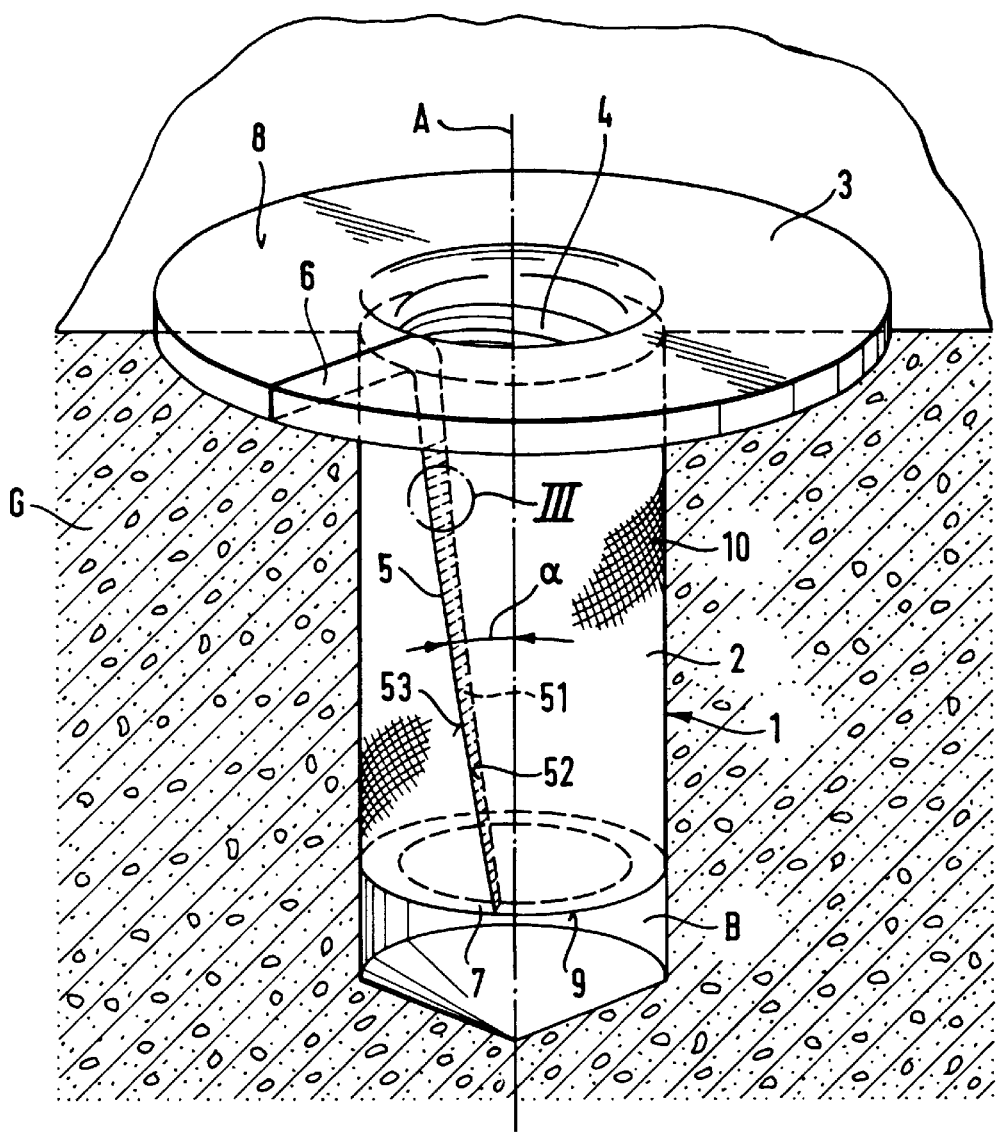
FIG. 2 shows a view similar to that of FIG. 1 but with the expansion dowel in an expanded condition thereof.

In FIGS. 1 and 2, which show a first embodiment of an expansion dowel according to the present invention, the expansion dowel is designated with a reference numeral 1. As shown in FIG. 1, the expansion dowel is received in a receiving bore B formed in ground G, and is shown in its unexpanded condition. FIG. 2 shows the expansion dowel 1 in its expanded condition. The expansion dowel 1 includes an expansion sleeve 2 which is provided, at its rear end, with a flange-shaped collar 3 which serves as load application means for securing a connectible constructional component. The expansion sleeve 2 has an axial through-bore 4. The bore 4 can be provided with an inner thread which enables attachment of a threaded rod. The expansion sleeve 2 is provided, along its entire length, with a slot 5 which is inclined relative to the axis A of the expansion sleeve. The longitudinally slotted expansion sleeve 2 extends in axial direction in such a way that the rear edge region 6 of the slots extends beyond the rear end surface 8 of the expansion sleeve, and the front edge region 7 of the slot 5 extends beyond the front end surface 9 of the expansion sleeve 2. Therefore, the outer diameter of the unexpanded expansion sleeve 2 is smaller than the diameter of the receiving bore 3.

FIG. 2 shows the expansion dowel 1 in its expanded condition. Axial impacts cause expansion of the expansion sleeve 2 in the region of the collar 3. At that, the edge surfaces of the longitudinal slot 5 slide along each other until the edge regions 6 and 7 of the slot 5, which project beyond the end surfaces 8 and 9 of the expansion sleeve 5, would be in the plane of the end surfaces 8 and 9.

FIG. 2 shows that the edge region lies in the plane of the rear end surface 8. When the angle α at which the longitudinal slot 5 extends relative to the axis A of the expansion sleeve 2, is smaller than or equal to a critical angle at which the self-locking takes place, then the friction force of the abutting each other edge surfaces of the slot 5 is adequate to retain the expansion sleeve 2 in its expanded condition.

Figure 3:
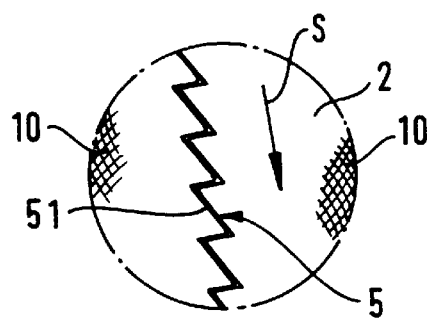
FIG. 3 shows a detail of an expansion dowel according to the present invention.

In order to insure that self-locking takes place and, particularly, when the inclination angle α is smaller than the self-locking angle, the edge surfaces of the longitudinal slot 5 are provided with additional means which prevents returning of the expansion sleeve 2 in its initial position. According to the enlarged detailed view (of a cut-out III in FIG. 2) shown in FIG. 3, the sliding relative each other edge surfaces 52, 53 of the longitudinal slot 5 are provided with toothing 51 which does not hinder the sliding of the edge surfaces in a setting directions while blocking backsliding of the edge surfaces in an opposite direction. Instead of the toothing, ribs or similar locking elements can be provided on the edge surfaces of the longitudinal slot 5.

As shown in FIGS. 1 and 2, the outer surface of the expansion sleeve 2 can be provided with projections, ribs and other similar high-friction means 10. The projections, ribs, and similar means 10 dig in into the wall of the receiving bore B during the expansion of the expansion sleeve 2 and form more or less strong distinctive form-locking connection which increases the holding action of the expansion dowel 1.

Figure 4:
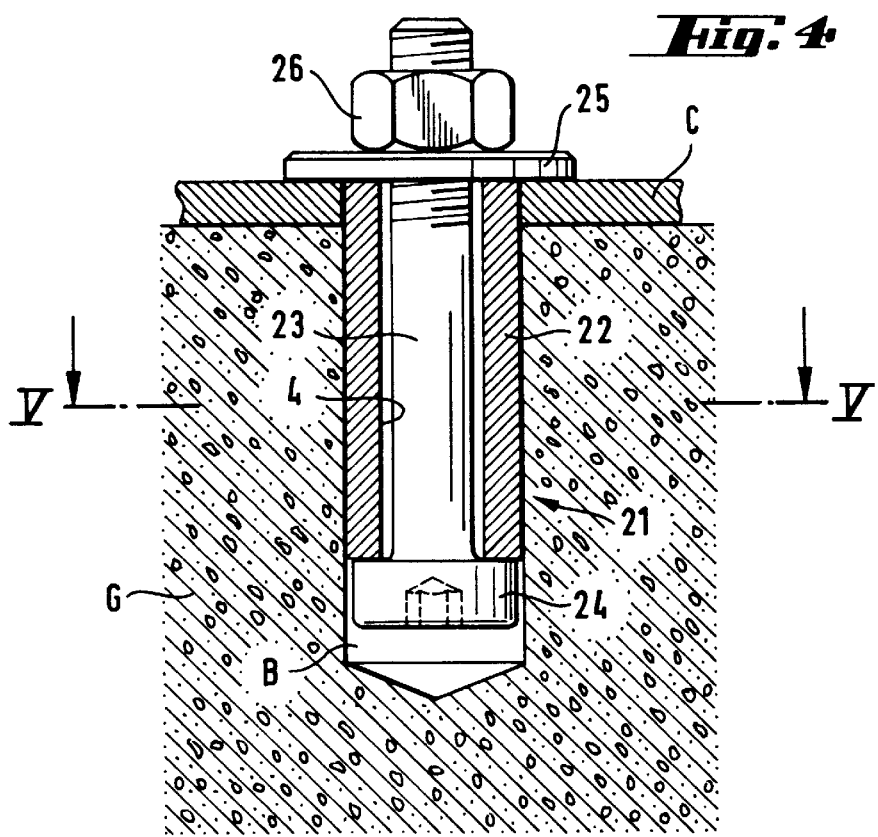
FIG. 4 shows a cross-sectional view of another embodiment of an expansion dowel according to the present invention.

FIG. 4 shows another embodiment of an expansion dowel according to the present invention, in which the expansion dowel is designated with a reference numeral 21. The expansion dowel 21 includes an expansion sleeve 22 having an axial through-bore 4 through which an anchor rod 23 is advanced. The expansion sleeve 22 is similar to the expansion sleeve 2 of the first embodiment of an expansion dowel according to the present invention and is likewise provided with a longitudinal slot inclined toward the axis of the expansion sleeve 22. The slotted expansion sleeve 22 again extends, in its unexpanded condition, so the a respective end regions of the longitudinal slot extend beyond the front and the rear end surfaces of the expansion sleeve 22. At the front, in the setting direction, end of the anchor rod 23, a head 24 is provided which forms a first stop for the front end surface of the expansion sleeve 22. The rear end of the anchor rod 23 is provided with an outer thread onto which a nut 26 is screwed on. The nut 26 can directly lie on the rear end surface of the expansion sleeve 22 or, as shown, a plane washer 25 can be provided between the nut 26 and the rear end surface of the expansion sleeve 2. The nut 26 or the washer 25 forms the second stop for the rear end surface of the expansion sleeve 22. Simultaneously, the washer 25 serve for securing a connection constructional component C.

The second stop, which is formed by washer 25 or the nut 26, is axially displaceable relative to the first stop formed by the head 24, by screwing the nut 26 onto the threaded rod 23 on a greater or lesser length. At that, the edge regions of the longitudinal slot, which extend beyond the end surfaces of the expansion sleeve 2 are pressed axially, whereby the expansion sleeve 22 radially expands in the receiving bore B of the ground G. In case the angle at which the longitudinal slot 5 is inclined toward the axis of the expansion sleeve 22, is larger than the angle of self-locking, the expansion sleeve 22 remains expanded only as long as the axial tension force is maintained. Upon removal of the tension force by loosening the nut 26, the expansion sleeve 22 again returns in its initial position, with the expansion sleeve outer diameter being reduced. Then the expansion dowel 21 can be completely withdrawn from the receiving bore B.

According to yet another embodiment of the present invention, instead of an anchor rod with an outer thread, there can be provided a sleeve with an inner thread which is surrounded by the expansion sleeve. In this case, the expansion sleeve is supported on a annular shoulder at the front end of the sleeve with the inner thread.

Figure 5:
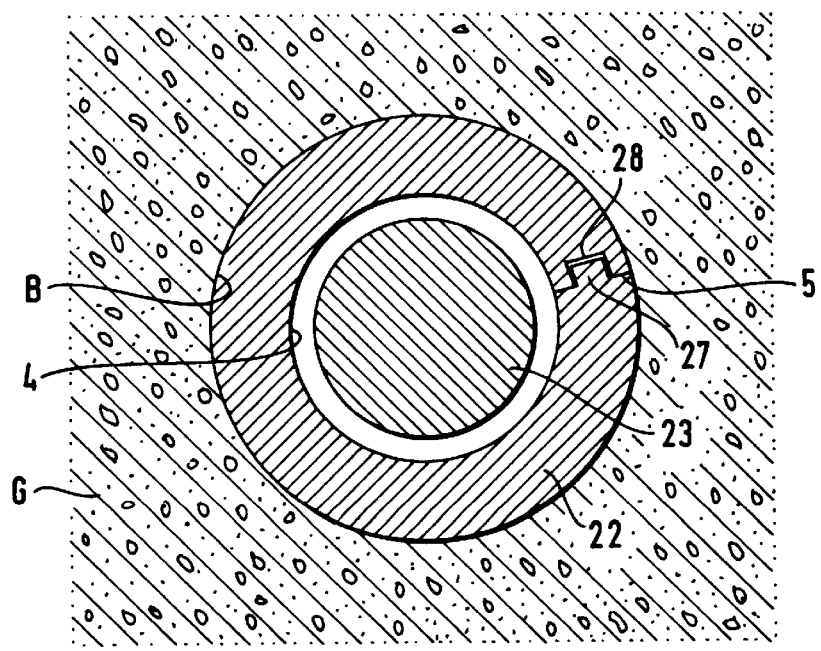
FIG. 5 shows a cross sectional view taken in a plane extending transverse to the axis of the expansion dowel shown in FIG. 4.

As shown in the cross-sectional view of FIG. 5, which shows a cross-section taken transverse to the axis of the expansion sleeve 2, the edge surfaces of the longitudinal slot 5 can be provided with guide elements 27, 28. The guide elements 27, 28 prevent radial displacement of the edge surfaces, while not interfering with the axial sliding thereof relative to each other. The guide elements can be formed by corresponding strips or flutes or, as shown, be formed as a groove 28 in one of the edge surfaces and as a projecting corresponding spring 27 in the other of the edge surfaces. While the guide elements 27, 28 are shown in connection with an embodiment of an expansion dowel according to the present invention, which includes an anchor rod for providing an adequate tension force, it should be understood that the expansion sleeve of an expansion dowel according to FIGS. 1 and 2, can also be provided with such guide elements in the slot edge surfaces.

Though the present invention as shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An expansion dowel, comprising:
    an expansion sleeve (2, 22) formed as a single piece and radially expandable upon application of an axial force thereto, the expansion sleeve (2, 22) having a slot (5), extending through a sleeve wall only at one location along an entire axial length of the expansion sleeve (2, 22) at an acute angle ($\alpha$) (8, 1) to an axis (A) of the expansion sleeve (2, 22), and the expansion sleeve (2, 22) extending in an axial direction in an unexpanded condition thereof so that a respective edge region (6, 7) of the slot extends beyond an end surface (8, 9) of the expansion sleeve (2, 22); and
    means (2, 52, 53; 51; 23, 24, 25, 26) for retaining the expansion sleeve (2, 22) in an axially compressed and radially expanded condition thereof,
    wherein the angle ($\alpha$) is smaller than or equal to a critical angle at which self-locking takes place, wherein the critical angle is defined by an expression $\alpha = \arctan(\mu \text{ slide})$, where ($\mu$ slide) is a friction coefficient of sliding friction, and wherein the retaining means are formed by edge surfaces (52, 53) of the slot (5) sliding relative each other.

2. An expansion dowel according to claim 1, wherein the edge surfaces (52, 53) of the slot (5) are provided with guide elements (27, 28) which axially slide relative to each other and prevent radial displacement of the edge surfaces relative to each other.

3. An expansion dowel according to claim 2, wherein the guide elements comprise a groove (28) formed in one of the edge surfaces and a corresponding spring (27), provided on another of the edge surfaces of the slot (5).

4. An expansion dowel according to claim 1, wherein the critical angle is from about 2° to about 6°.

5. An expansion dowel according to claim 5, wherein the edge surfaces (52, 53) of the slot (5) have cooperating tootings (51).

6. An expansion dowel according to claim 1, wherein the angle $\alpha$ at which the slot (5) extends toward the axis (A) is greater than a critical angle at which self-locking takes place, wherein the critical angle is defined by an expression $\alpha = \arctan(\mu_{SLIDE})$ where ($\mu_{SLIDE}$) is a friction coefficient of sliding friction, and wherein the expansion sleeve is located between two axially spaced stops (24, 25, 26), which are provided on an anchor rod (23), are displaced axially relative to each other upon axial compression of the expansion sleeve (22), and form the means for retaining the expansion sleeve sleeve (22) in the axially compressed and radially expanded condition thereof.

7. An expansion dowel according to claim 6, wherein the anchor rod (23) is formed as a head bolt, with the head (24) forming a front, in a setting direction, stop, and wherein the rear stop is formed by a nut (26) screwed on an outer thread provided on a rear end of the head bolt (23).

8. An expansion dowel according to claim 7, further comprising a plane washer (25) located between the nut (26) and the rear end surface of the expansion sleeve (22).

9. An expansion dowel according to claim 1, wherein the single-piece expansion sleeve comprises as a sheet metal bent stamping.

10. An expansion dowel according to claim 1, wherein an outer surface of the expansion sleeve (2, 22) is provided with high-friction means (10).

* * * * *